United States Patent [19]

Jacovitz

[11] Patent Number: 4,539,874
[45] Date of Patent: Sep. 10, 1985

[54] TOOL DRIVER AND FASTENER APPARATUS

[76] Inventor: Bernard Jacovitz, 2100 S. Ocean La., Fort Lauderdale, Fla. 33316

[21] Appl. No.: 587,891

[22] Filed: Mar. 9, 1984

[51] Int. Cl.³ .............................................. B25B 23/10
[52] U.S. Cl. ...................................... 81/454; 411/403; 411/407
[58] Field of Search ............... 411/403, 402, 405, 406, 411/407, 408, 410; 81/451, 452, 454

[56] References Cited

U.S. PATENT DOCUMENTS

| 101,207 | 3/1870 | Apgar | 411/403 |
| 258,061 | 5/1882 | Haviland | 411/402 X |
| 743,329 | 11/1903 | Renn | 411/403 |
| 954,073 | 4/1910 | Bender | 411/407 X |
| 1,997,422 | 4/1935 | Lorenzen . | |
| 2,566,055 | 8/1951 | Daderko, Sr. . | |
| 3,604,487 | 9/1971 | Gilbert | 411/403 X |
| 4,339,971 | 7/1982 | Zatorre | 81/436 |
| 4,369,678 | 1/1983 | Cooper | 411/407 X |

FOREIGN PATENT DOCUMENTS

| 8180 | 8/1897 | Sweden | 81/454 |
| 1082 | of 1915 | United Kingdom | 411/427 |

Primary Examiner—Gary L. Smith
Assistant Examiner—Adrian H. Whitcomb, Jr.

[57] ABSTRACT

A tool driver and fastener that prevents the driver from lifting up off the fastener. The fastener has at least one undercut slot that matches with a blade on the driver to prevent uplift. The driving tool and fastener mate with one another and have respective cross-sectional configurations that can interlock temporarily for allowing a screw or a bolt with a slot or head with a plurality of sides to be driven into or removed from a work place without movement of the driver up off of the fastener. The driver may be a screw driver or wrench with a blade in a plane transversed to the longitudinal axis of rotation of the driver. The fastener may include a main slot in one plane containing the center line of the fastener and a second slot transverse to the first slot and perpendicular to the first slot.

6 Claims, 9 Drawing Figures

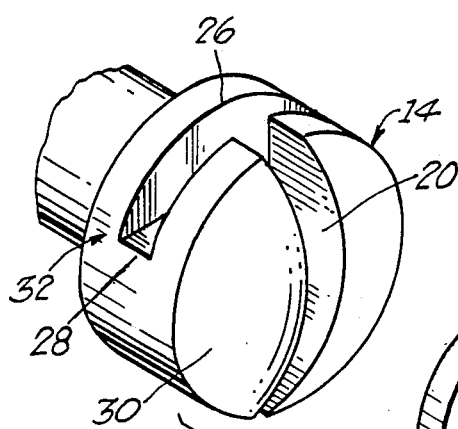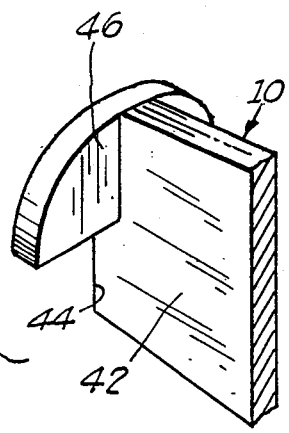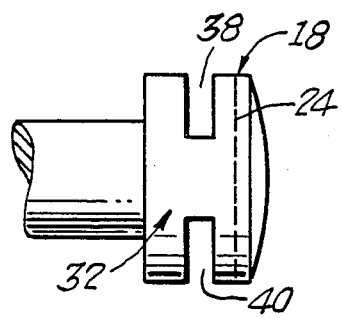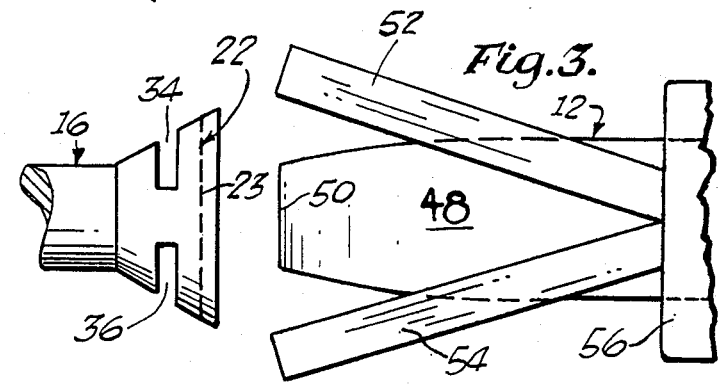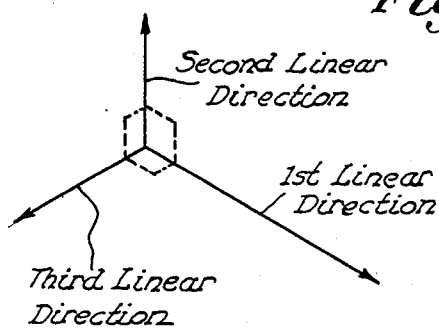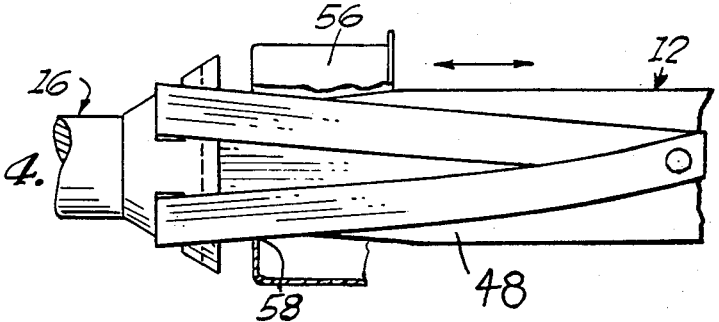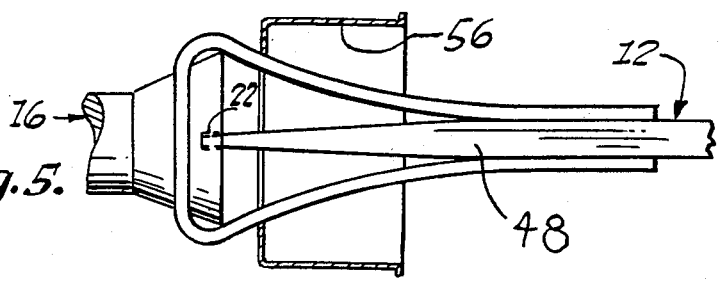

TOOL DRIVER AND FASTENER APPARATUS

BACKGROUND OF THE INVENTION

The present invention is to a tool driver for a fastener such as screw driver or bolt driver. The driver includes a first blade and a second blade for engaging slots in a fastener. The fastener includes two slots, a normal face slot and a second undercut slot. The driver is operated by one hand of a user and is mated with the fastener without rotating the driver about its longitudinal axis to hold the driver and fastener together.

In the past prior art drivers when mated to a fastener would fall apart when moved into various positions. Also when the blade of a screw driver is rotated about it longitudinal axis under pressure the driver will often slip out of the normal face slot of a screw fastener. Such action normally destroys the normal face slot formed in a screw. The normal face slot is round off by the edges of the screw driver blade. Such action destroys the normal face slot and the only means for removing a screw or sloted bolt. In such cases the screw or bolt must thereafter be taped in order to ease it out of a hole.

Prior art U.S. Pat. No. 4,339,971 discloses a driver having two blade positions, both of which can move into the fastener through the entrance into the normal face slot. This patent does not teach the disclosed invention.

The present invention overcomes the present problems providing a second blade that fits into the second undercut slot with its own entrance in the fastener. The normal face slot is in the head of the fastener in a plane calinear with the longitudinal axis of the fastener. If one defines the longitudinal axis of the fastener to be a first linear direction, the second undercut slot lies in a plane transverse to, and preferably orthogonal with, the normal face slot and positioned generally transverse to the longitudinal center line of the fastener.

In other words, the second planar slot lies in a plane defined by a second and a third direction, each orthogonal to one another, and both orthogonal to the first direction.

BRIEF DESCRIPTION OF THE INVENTION

This invention relates to a tool driver such as a screw driver or bolt driver and a mating fastener. The fastener such as a screw or bolt has a normal face slot and a second slot for insertion of the driver blades for tightening and untightening the fastener. The driver has a normal screw driver first blade and a second blade connecting together on the elongated body of the driver. The driver and fastener mate with one another and are held together for movement into various positions. The mating parts have structural configurations that temporarily interlock the driver and fastener, allowing the fastener to be moved to a fastening position and to thereafter be driven into or removed from a work position. The mating parts lock the driver's first blade into the normal face slot preventing the first blade from accidentally raising up out of the normal face slot while maintaining the generally parallel sides of the first blade in generally parallel juxtaposition with the generally parallel sides of the normal face slot. Thereby the maximum turning force can be applied to rotate the driver about its longitudinal axis without applying additional longitudinal mating force toward the fastener to hold the first blade in the normal face slot. The driver consists of the main first blade in one plane that contains the longitudinal axis of the driver and a second blade in a second plane that ties generally transversed to the longitudinal axis of the driver and generally perpendicular to the plane of the first blade.

The fastener includes a normal face slot in the head of the fastener. The normal face slot is in a plane that contains the longitudinal center line of the fastener and its shaft with slot sides generally spaced apart and parallel to one another. The second slot is generally transverse to the longitudinal center line of the fastener and generally perpendicular to the plane of the normal face slot. The second slot is in the side of the fastener shaft or in the side of the head of the fastener. The second slot is positioned below the upper distal surface of the head of the fastener. The second slot has an entrance that is separate from the entrance to the normal face slot.

The first blade is placed in the normal face slot in the fastener to engage and mate with the sides of the normal face slot in a normal manner to place the fastener into a workpiece or remove the fastener from a work position. The first blade engages and lies flat against the sides of the normal face slot. The second blade is placed into the second slot by a transverse movement of the second blade relative to the longitudinal center line of the fastener to fully mate the driver blades and the fastener slots. The mated driver and fastener will not move apart even when a great turning torque is applied to the driver and even when the mated driver and fastener are placed into various positions. The disclosed driver and fastener allow the fastener and driver to be moved toward and away from the work piece as a unit, secured together, so that the user need only use one hand to place the screw or bolt into a desired location.

It is an object of this invention to provide a driver and fastener combination that allows maximum torque to be applied with minimum longitudinal force moving the driver and fastener together while the operator uses only one hand to rotate the driver.

It is another object of this invention to provide noncomplex mating fastener and tool driving means that is easily manufactured.

It is an additional object of this invention to releasably secure a driver and fastener together.

In accordance with these and other objects which will be apparent hereinafter, the instant invention will now be described with particular reference to the accompanying drawings.

BRIEF DESCRIPTION OF THE DRAWINGS

In the drawing:

FIG. 1 is an isometric exploded view of the driver and a fastener.

FIG. 2 is an isometric mated view of the driver and fastener shown in FIG. 1.

FIG. 3 is an exploded side view of another embodiment of a driver and fastener.

FIG. 4 is a mated side view of the driver and fastener shown in FIG. 3.

FIG. 5 is a mated top view of the other side of the driver and fastener shown in FIG. 4.

FIG. 6 is a side view of a slotted bolt with a square head.

FIG. 9 illustrates the three orthogonal directions, referred to above.

DESCRIPTION OF THE PREFERRED EMBODIMENT

Figure 7:
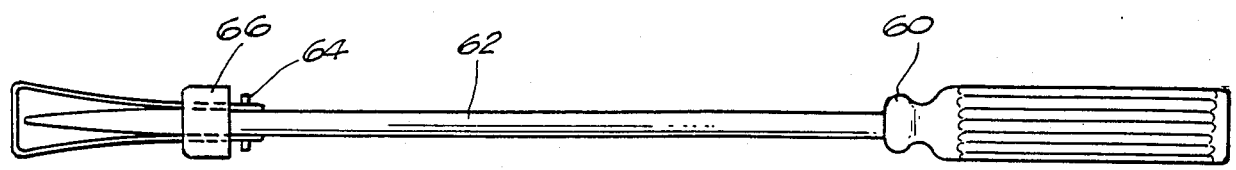
FIG. 7 is a top view of a screw driver.

Referring now to the drawings, FIGS. 1 and 2 illustrating one embodiment of the invention, the driver 10 and fastener 14 in FIG. 1 are mated together in FIG. 2. The fasteners 14, 16, 18 and 8 in FIGS. 1, 2, 3, 4, 5, 6 and 7 show a screw or bolt with a normal face slot 20, 22, 24 and 86 respectively and with a second slot 26; 34 and 36; 38 and 40 and 84 respectively for insertion of the driver for tightening and untightening the respective fastener. The driver 10 and 12 have a first blade 42 in FIGS. 1 and 2 and a first blade 48 in FIGS. 3 through 5 respectively. The drivers have a second blade 46 in FIGS. 1 and 2 and a pair of second blades 52 and 54 in FIGS. 3 through 5.

In FIGS. 1 and 2 the driver 10 and fastener 14 mate with one another and have respective configurations that can temporarily interlock as shown in FIG. 2 to allow the fastener to be moved to a work location or to be driven into or removed from a work place. The temporary interlock occurs when the first blade 42 of the driver to be placed into the normal face slot 20 of the fastener 14 with the distal edge 44 at the bottom of the normal face slot and the second blade 46 is placed in the second slot 28. The interlock prevents the first blade 42 from raising up out of the slot 20 when torque is applied to the first blade 42. Therefore maximum turning force can be applied to the driver, such as a screwdriver, without applying an additional downward force to hold the driver and fastener together. The first blade 42 engages and lies flat in the slot 20 along the side walls of the slot. The driver includes both first blade 42 in one plain containing the longitudinal axis of the driver and a second blade 46 in a second plain that is transversed to the longitudinal axis of the driver. The fastener 14 includes the main slot 20 in the head of the fastener. The main slot 20 is in one plane containing the center line of the fastener and a second slot 28 is transverse to the center line of the fastener 14. The second slot 28 opens up into the normal face slot as shown in FIGS. 1 and 2. The first blade 42 is placed in the normal face slot 20 in the fastener to engage and mate with the sides of the slot in a normal manner for applying a turning force to the fastener.

The second blade 46 and the second slot 28 are engaged by a transverse movement of the driver relative to the longitudinal center line of the fastener to fully mate the driver's two blades and the fastener two slots. The mated driver 10 and fastener 14 will not move apart even if placed in a plurality of positions. The user can operate the mated driver and fastener with one hand.

With particular, but not exclusive, reference to FIGS. 3 through 5 and 7 the driver 12 mates with fastener 16. The driver 12, and fastener 16 mate with one another and have respective configurations that can temporarily interlock as shown in FIGS. 4 and 5 to allow the fastener to be driven in or removed from a work place. The temporary interlock allows the first blade 48 of the driver to be placed into the normal face slot 23 of the fastener 16 with the bottom of the slot shown as 23. The second slots 34 and 36 engage blades 52 and 54 to prevent the first blade 48 from raising up out of the slot when torque is applied. Therefore maximum turning force can be applied to the driver, such as a screwdriver, without applying an additional force to hold the driver and fastener together. The driver has a handle 60, shaft 62 and connector 64 holding the blades 52 and 54 on the driver, see FIG. 7. The first blade 48 engages and lies flat in the slot 22 along the side walls of the slot. The driver includes first blade 48 in one plane and two second blades 52 and 54 in a second plane that is transverse to the lonitudinal axis of the first blade 48 and shaft 62. The two second blades 52 and 54 interlock with the two second slots 34 and 36. The fastener 16 includes a main slot 22 in the head of the fastener. The main slot 22 is in one plane and the two second slots 34 and 36 are below and to the side of the normal face slot 22 in FIGS. 3, 4 and 5. The first blade 48 is placed in the normal face slot 22 in the fastener to engage and mate with the sides of the slot in a normal manner for applying force to the fastener. The fastener 16 will not move apart in any position. The ferrule 56 or 66 is moved toward the blades to move blades 52 and 54 into slots 34 and 36 as illustrated.

Figure 8:
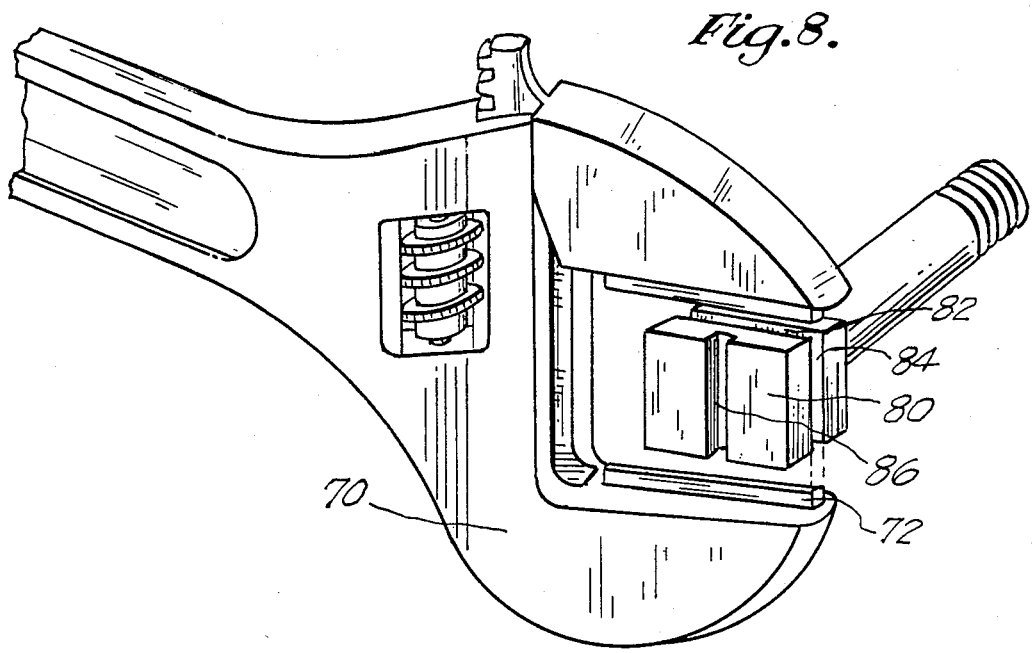
FIG. 8 is an isometric view of a wrench and bolt.

Fastener 32 is a square headed bolt with a normal face slot 24 and two second side slots 38 and 40. When such a bolt has second slots 82 and 84 all around the head of face slot 86, a wrench 70 as well as a blade driver may be used to tighten and untighten the fastener. The wrench 70 has blades 72 as shown in FIG. 8. The wrench 70, a tool, and fastener in FIG. 8 mate with one another and have respective configurations that can temporarily interlock as shown in FIG. 8 to allow the fastener to be driven in or removed from a work place. The temporary interlock allows the wrench to be placed in the normal manner but with blades 72 on the top and bottom to prevent the jaws of the wrench from raising up off of the head of the bolt when torque is applied to the wrench. Therefore maximum turning force can be applied to the driver shown as a wrench without applying an additional downward pressure force to hold the wrench and fastener together.

The instant invention has been shown and described herein in what is considered to be the most practical and preferred embodiment. It is recognized, however, that departures may be made therefrom without the scope of the invention and that obvious modifications will occur to a person skilled in the art.

What is claimed is:

1. The combination of a fastener and a tool driver comprising:
    an elongated body extending along a longitudinal center line;
    a handle connected at one end of said body,
    a first blade means at the other end of said body,
    said first blade in one plane containing the longitudinal center line,
    at least two second blade means, each said second blade means having a generally linear edge portion in a plane, each said plane positioned generally transverse to the longitudinal center line,
    each said second blade means including a planer portion connected to said elongate body,
    said fastener including an elongae shaft extending generally along said longitudinal center line, said shaft having fastening means,
    a head located at one end of said shaft, said head including a base portion abuttingly attached to said one end of said shaft, and a face portion at the distal end of said face portion,
    said face portion of said head having a normal face slot means for receiving said first blade means of said driver, said normal face slot means positioned in a plane containing the longitudinal center line, said slot includes two generally parallel sides extending toward said shaft, said fastener further including at least two second slot means undercutting said face portion of said head, each said two second slot means being disposed transverse to the center line of said shaft, each said second slot means being disposed generally parallel to the other, and both said second slot means generally perpendicular to said normal face slot, said first blade means constructed and arranged to mate in said normal face slot means for driving said fastener into and out of a connecting location in coplanar contact with said sides of said normal face slot means, and each said second blade means constructed and arranged to mate in a respective one of said second slot means by insertion of each said linear edge portion of each said second blade means into said respective one of said second slot means to prevent separation of said first blade from said normal face slot of said fastener and to allow movement of the fastener to and from the connecting location with the user holding only said handle, each said linear edge portion being disposed parallel to the other, and both said linear edge portions being generally perpendicular to said first blade means.

2. A combination as set forth in claim 1, wherein: said second blade is relatively movable in relationship to said first blade.

3. A fastener, comprising:

an elongate shaft extending generally along a longitudinal center line, said shaft having fastening means, and a head located at one end of said shaft, said head including a base portion abuttingly attached to said one end of said shaft, a face portion at the distal end of said face portion, said face portion of said head having a normal face slot means for receiving the blade of a tool driver, said normal face slot means positioned in a plane containing the longitudinal centerline, said normal face slot includes two generally parallel sides extending toward said shaft with a first slot bottom, said fastener further including two second slot means disposed in said head on opposite sides of said normal face slot means, each said second slot means undercutting said face portion of said head, both said second slot means being disposed transverse to the center line of said shaft and generally perpendicular said normal face slot means, each said second slot means including an entrance and two generally parallel sides and a second slot bottom positioned on the same side of the longitudinal center line as said entrance.

4. A tool driver, comprising:

an elongate body extending along a longitudinal center line, a handle connected at one end of said body, a generally linear first blade at the other end of said body, said first blade in one plane containing the longitudinal center line, at least two second blades in respective planes positioned generally transverse to the longitudinal center line, each of said second blades being disposed on an opposite side of said first blade from the other of said second blades, each of said respective planes being disposed generally perpendicular to said linear first blade, each said second blade includes a planer portion connected to said elongate body, each said second blade includes a distal edge movable relative to said first blade for movement into a transverse fastener slot.

5. A tool driver as set forth in claim 4, wherein:

said second blade is relatively movable in relationship to said first blade.

6. The screwdriver of claim 3, including:

a ferrule disposed about said elongated body, said ferrule movable along said elongated body to squeeze together said two second blades toward the longitudinal center line of said fastener.

* * * * *